Dec. 24, 1935.  J. A. ZUBLIN  2,025,258
CUTTER FOR DRILL BITS
Filed Aug. 6, 1934  2 Sheets-Sheet 1
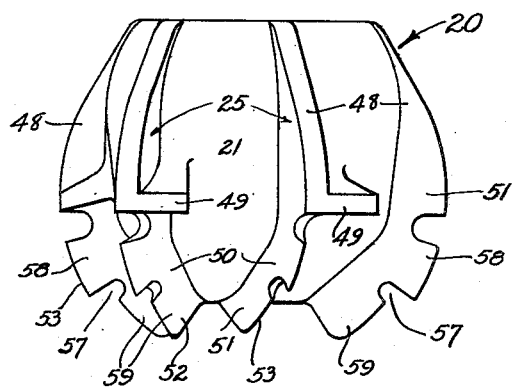
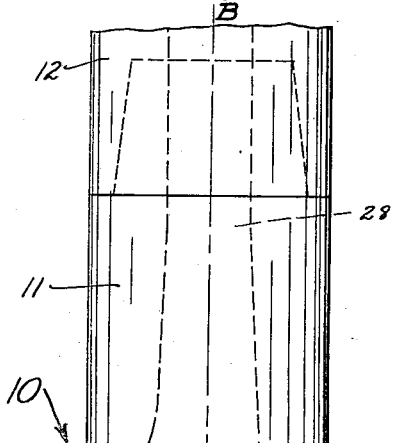
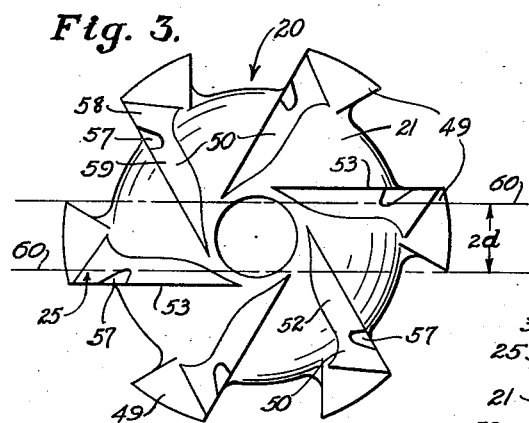
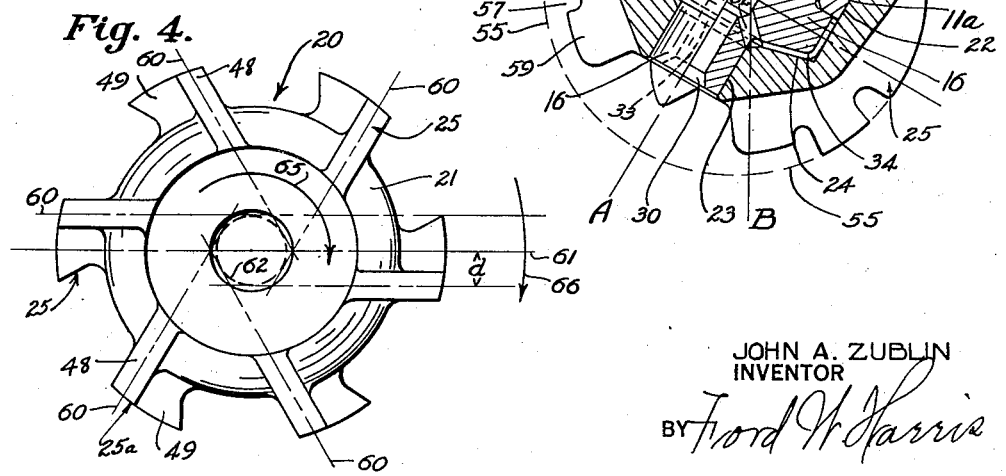
JOHN A. ZUBLIN
INVENTOR
ATTORNEY Dec. 24, 1935.   J. A. ZUBLIN   2,025,258
CUTTER FOR DRILL BITS
Filed Aug. 6, 1934   2 Sheets-Sheet 2

JOHN A. ZUBLIN
INVENTOR

BY
ATTORNEY

Patented Dec. 24, 1935

2,025,258

UNITED STATES PATENT OFFICE 2,025,258

CUTTER FOR DRILL BITS

John A. Zublin, Bel Air, Calif.

Application August 6, 1934, Serial No. 738,685

10 Claims. (Cl. 255—71)

The present invention relates to drill bits, and more especially to improvements in cutters for bits of the kind shown in my prior patents 1,859,948, issued May 24, 1932, and 1,758,773 and 1,758,814, both issued May 13, 1930. In bits of this type there is provided a cutter with external cutting blades, the cutter being rotatably mounted on the shank to revolve about an axis inclined to the shank axis, which is normally vertical, to bring the blades successively into soil engagement.

Naturally, a high soil removal rate without undue and excessive wear of the cutter blades is very desirable in drilling oil wells, since drilling costs are lowered and oil production is started sooner than with a slow cutting bit. Certain difficulties have arisen in securing maximum cutting speed in bits used in the softer formations. These formations are best removed by a slicing or cutting motion of the blades rather than by impact, and preferably by a motion having a relatively long slicing motion on each stroke, since the longer the cutting portion of a given stroke the greater the proportion of cutting time. Too much scraping motion is objectionable for this tends to ball up the cutter by accumulating sticky cuttings on the blades and so lessening its penetrative efficiency.

Hence it becomes a general object of the invention to provide a cutter with blades of a shape and outline particularly adapted to cutting softer formations and capable of a very rapid cutting action without unnecessary wear on the blades.

And it is another object to provide a cutting blade having a relatively long slicing motion and a short withdrawal motion so that as large a portion as possible of each stroke is devoted to cutting.

A further object is to provide a self-cleaning blade which will not accumulate cuttings but will remain clean and at highest cutting efficiency.

These objects have been attained by providing blades with longitudinal cutting edges of a generally arcuate outline and by offsetting the blades from radial planes so that the central planes of the blades are eccentric to the cutter axis.

How these and other objects of my invention are attained will be better understood by reference to the following description and annexed drawings in which I show a present preferred form of cutter.

In the drawings:

Fig. 1 is a side elevation of an assembled bit, with the cutter and a portion of the bit shown in vertical section;

Fig. 2 is a side elevation of a cutter removed from the bit;

Fig. 3 is a bottom view of the cutter of Fig. 2;

Fig. 4 is a top plan view of the cutter of Fig. 2; and

Figure 5:
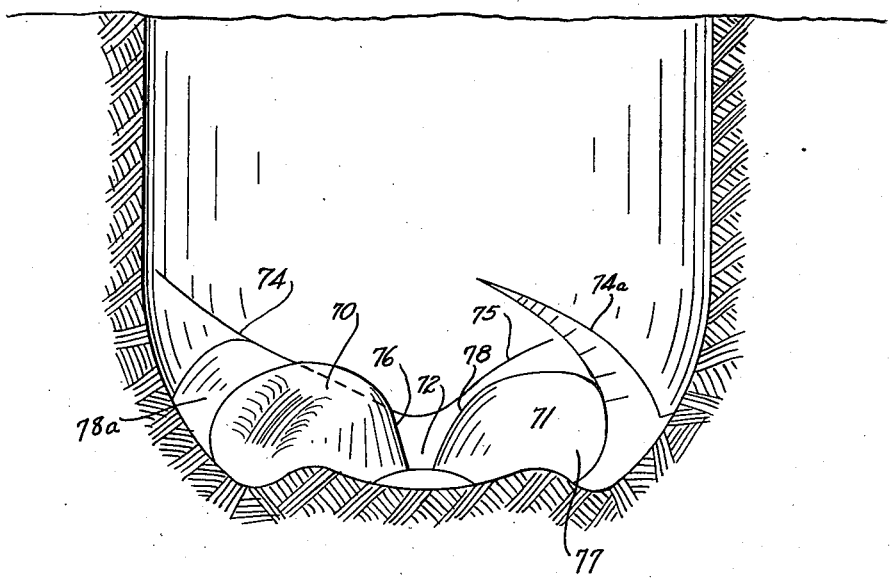
Fig. 5 is a vertical section of the bottom of a well drilled by the bit.

Fig. 1 shows a completely assembled bit 10 comprising a shank or body portion 11 which is threaded into a drill collar 12 on the lower end of a string of drill pipe. The lower end of shank 11 terminates in an eccentric inclined bearing portion generally indicated at 15 about which the cutter revolves. Bearing 15 includes the cylindrical end portion 11a of the shank which is exteriorly surfaced to provide a bearing, and thrust bearing pin 16 which is threaded into a recess formed in the end of shank portion 11a, the threads being indicated at 17. Axis A—A of bearing portion 15 is inclined to the normally vertical axis B—B of the shank and intersects the latter axis at C.

The cutter generally indicated at 20 comprises a bowl-shaped body 21 provided with internal bearing surfaces complementary to the surfaces of shank bearing 15. The cutter revolves about cylindrical surfaces indicated at 22 and 23, and the intermediate inclined bearing surface at 24 forms a shoulder to take thrust along axis A—A. The cutter body is provided with a plurality of externally projecting blades 25 as may be seen best in succeeding figures.

The bit shank is provided with a streamlined water course 28 for introducing circulating fluid into the well. This passage communicates directly with the central passage 29 in thrust pin 16 which terminates in orifice 30 through which the water enters the well bore.

An auxiliary passage 32 places passage 29 in communication with lower annular passage 33 and, by means of passage 34, with upper annular passage 35 so that circulating fluid may be taken from the central water course to the several bearing faces for lubricating the same. The shank also contains a branch water course 36 which opens through nozzle 37 to direct a stream of circulating fluid against the cutter blades.

Cutter 20 is held upon bearing 15 by means of a plurality of ball bearings 40 contained in a ball race, half of which is formed by annular groove 41 in shank portion 11a and the other half by annular groove 42 in the interior face of the cutter body. When the balls are in the race, they prevent the removal of the cutter endwise from bearing 15. Removal of the cutter is accomplished by first taking out the balls which are held in place by means of lock plug 43 secured by screw 44. This lock is detailed further in my above mentioned Patent 1,859,948.

The soil removing elements are blades 25 which project outwardly from and extend longitudinally from top to bottom of the cutter body. As may be seen in Fig. 2, the upper portion 48 of each blade is generally rectangular in cross-section and terminates in a horizontal portion 49, also of rectangular cross-section. This upper L-shaped portion of the blade is generally designated as the reaming tooth since it operates chiefly upon the side walls of the well bore to enlarge to full diameter the hole first made by the lower portion 50 of the blades.

Blade section 50 below the reamer is generally referred to as the digging portion since it operates chiefly on the bottom of the well. This portion of the blade is generally triangular in cross-section, being here shown as having its forward face 51 parallel to the central plane of the cutter and its back face 52 inclined thereto so that the tooth section is in the nature of a right triangle; and, as will be seen, both faces 51 and 52 are non-radial. The apex of this triangular section forms a cutting edge 53 extending longitudinally of the blade and capable of knife-like slicing action. The number of blades 25 may differ from the number shown, but either four or six are preferred, depending upon the size of the cutter, since it has been found that if the blades are not spaced far enough apart there is a tendency for the cuttings to pack in between.

The outline of the cutting blades is perhaps best seen from Fig. 1. The outer edges of the reamers are defined in part by a spherical surface 55 having its center located upon axis A—A at D, which is the center of gyration of the cutter. The upper ends of the reamers are defined by conical surface 56 with its apex on axis A—A and its elements tangent to sphere 55 as described in my aforementioned Patent 1,859,948.

The digging portion 50 of each blade is subdivided by a slot 57 into an upper tooth 58 and a lower 59, each of these teeth having arcuate cutting edges 53 with the centers of the arcs lying on axis A—A. The radius of tooth 58 is equal to the radius of sphere 55 so that the cutting edge of the tooth lies in the continuation of the reamer edge immediately above that tooth, and the center of curvature of the tooth is at point D. The radius of lower tooth 59 is less than the radius of tooth 58, and the center of curvature is preferably also located at D. Thus it will be noted that the radii of the digging teeth, considered in succession downwardly along the cutter, are of decreasing length.

Taking the several digging teeth of the cutter, the cutting edges of all the upper teeth will be seen to lie in sphere 55 and the cutting edges of the lower teeth will lie in a second smaller concentric sphere with its center at D.

The location of point D, which is the center of sphere 55, may be at C, which is the intersection of axes A—A and B—B, or it may be at some point on axis A—A below C. It is preferred that D fall at some point below C as indicated since the center of the cutter is then eccentric to the center of the shank and this aids in the drilling of a hole having a diameter slightly greater than the diameter of the cutter. The nominal diameter of the cutter is equal to the diameter of sphere 55 since the diameter of this sphere is the controlling factor in determining the size of the hole drilled.

The cutting blades are positioned on the outside of the cutter bowl so as to be eccentric relative to the cutter axis rather than radial, as may be seen in the drawings. The central planes 60 of the blades, which are those planes passing through the centers of the reaming portion 48 and the base of the triangular portion 50 of each blade, do not intersect axis A—A within the limits of the cutter body and are therefore preferably, but not necessarily, parallel to axis A—A. Planes 60 are spaced or offset from a radial position, indicated by center line 61, by an amount $d$, as indicated in Fig. 4; and since cutting edges 53 lie in planes parallel to central planes 60, they are offset from the cutter axis an amount equal to $d$ plus half the blade thickness. Thus the several central planes 60 are all tangent to an imaginary cylindrical surface 62 concentric to axis A—A. As a result, instead of two opposed teeth having a common plane 61 passing through the cutter axis as would be the case were the blades occupying radial positions, these opposite blades will lie in parallel planes passing on opposite sides of the cutter axis and spaced apart an amount $2d$ as indicated in Fig. 3.

The drill stem turns to the right or clockwise, when viewed from above, and the cutter rotates in the same direction, as indicated by arrow 65 (Fig. 4), relative to the earth, but turns more slowly, so that the cutter turns counter-clockwise relative to shank bearing 15. Since the planes 60, and likewise cutting edges 53 and faces 51 are removed in the direction of arrow 66 (Fig. 4) from the cutter axis or from a radial position 61 they may be considered as being offset forwardly from an axial or radial position in the direction of rotation of the cutter body relative to the formation being drilled. The offset blades remain parallel to the position they would occupy if radial. If an axial plane containing axis A—A is passed through the outermost portion of a cutting edge, that is, where edge 53 intersects a circumscribing circle determined by the outer faces of reaming sections 49, and a plane containing the offset edge is also passed through said intersection with the circumscribing circle, the offset plane lies at an angle with the axial plane and, relative to the latter, is directed inwardly and forwardly in the direction of cutter rotation relative to the earth.

In general, the cutting action of the bit is the same peculiar gyratory movement described in my above mentioned patents and to which reference is made for a detailed explanation. In bits of this type the cutter axis A—A moves in a conical locus and the cutter revolves about this axis and bearing 15, with the result that blades 25 move successively into and out of the cutting position, which is the lowermost or right hand position of Fig. 1. This action forms a symmetrical pattern on the well bottom of depressions cut by the blades and separated by intervening ridges of soil, with the result that the blades engage these ridges and rotate both on the bit shank and relative to the formation. The number of depressions is less than the number of teeth and depends in part on the nature of the formation being cut. The bottom of the well and the cutter form in effect a pair of meshing gears so the cutter is spoken of as being "geared" to the formation and revolves at a rate other than that of the bit shank turned by the drill stem.

The six bladed cutter shown will typically form four ridges on the well bottom with the depressions between all centrally connected in the form of a cross. A vertical median section of such a hole is shown in Fig. 5 with the section plane passing through one arm of the cross formed by the depressions to show in elevation two ridges 70 and 71. The other arm of the depression separates the two ridges at 72.

Offsetting the blades as described causes an unusually long slicing motion of the reamers, as shown by the downwardly sloping line at 74 defining the bottom of a reamer path; the withdrawal of the reamer from its lowermost position is shown by line 75. This indicates that of a total stroke, from engagement to disengagement of the blade, the reamer is cutting about two-thirds of the time. The path of the next reamer is shown at 74a.

The upper digging teeth 58 cut down the forward sides of ridges 70 and 71 at 76 and 77 respectively, with the sloping tooth sides 52 against the formation. A longer and improved cutting action results from offsetting the blades, since the angle of the blade to the formation is changed from what it is when the blade is radial. If Fig. 4 is assumed to be a view perpendicular to axis A—A in Fig. 1, but rotated 90 degrees, it will be seen that blade 25a will reach a vertical position before the cutting edge is directly beneath the cutter axis, i. e. before it is at the lowest point in depression 72. As the cutter rolls on after cutting down face 76, the blade rapidly tilts over past the vertical and is withdrawn at a flat angle so the tooth scrapes over face 78 of ridge 77 with a wiping motion that scrapes accumulated cuttings from flat tooth face 51 and also dresses the tooth with a self-sharpening action. The path of a previous tooth is shown at 78a.

The lower digging teeth 59 cut away the center of the hole to join all four depressions 72, with a combined slicing and scraping motion, but their movement is very similar to that of teeth 58.

The blade shape shown with a cutting edge extending longitudinally of the blade thus gives a highly efficient slicing action that rapidly cuts away the formation. This action is further improved by offsetting the teeth, but in a simplified form of cutter the offsetting may be omitted. However, the offsetting may also be applied to blades of shapes and outlines other than those shown. Various other changes in design and construction will occur to those skilled in the art but will still be within the spirit and scope of my invention; therefore it is intended that the foregoing disclosure be construed as illustrative of rather than limitative upon the broader claims appended hereto.

I claim as my invention:

1. In a gyratory well drilling bit, a cutter body adapted for rotation thereon and having cutting blades extending longitudinally of the axis of said body and outwardly therefrom, the edge portions of said blades being angularly directed inwardly and forwardly, in the direction of rotation of the cutter relative to the formation being drilled, from axial planes passing through the points of intersection of such edges with a circle circumscribing the outermost portions of said blades.

2. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, the blades extending outwardly from the cutter body and having their cutting edges lying substantially in planes tangent to a cylinder concentric with the cutter body axis and offset from an axial plane parallel thereto forwardly in the direction of rotation of the cutter relative to the formation being drilled.

3. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, each blade extending outwardly from the cutter body in a position forwardly of, in the direction of cutter-rotation relative to the formation being drilled, and parallel to the position the blade would occupy if disposed in a substantially radial position.

4. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, each of the blades having a lower portion, triangularly shaped in cross-section forming longitudinal cutting edges, said lower blade portion having an upper tooth with an arcuate cutting edge lying in the surface of a sphere having its center on the cutter axis and a diameter substantially equal to the nominal diameter of the bit.

5. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, each of the blades having a lower portion, triangularly shaped in cross-section forming longitudinal cutting edges said lower blade portion having digging teeth with arcuate cutting edges lying in the surfaces of spheres having their centers at a common point on the cutter axis, the radius of the spherical surface containing the cutting edge of the upper tooth being the greatest and equal to half the nominal diameter of the bit.

6. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, each of the blades having a lower portion, triangularly shaped in cross-section, forming a longitudinal cutting edge, said lower blade portion being subdivided into digging teeth with cutting edges lying in the surfaces of concentric spheres having their common center at the center of gyration of said cutter, the teeth being of downwardly decreasing radii.

7. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, each of said blades having an upper reaming section formed with a continuous spherical reaming edge, and a lower digging section, triangularly shaped in cross-section to form a longitudinal cutting edge, a portion of which lies in the same spherical surface as said spherical reaming edge, said digging section being subdivided into digging teeth with arcuate cutting edges.

8. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, the blades extending outwardly from the cutter body and having their central planes directed angularly inwardly and forwardly, in the direction of rotation of the cutter relative to the formation being drilled, from axial planes passing through the point of intersection of such central planes with a circle circumscribing the outermost portions of said blades, and each of the blades having a lower portion, triangular in cross-section, forming a longitudinal cutting edge, said cutting edge being formed with two teeth of arcuate outlines with a common center on the cutter axis but of different radii, the radius of the lower tooth being the lesser.

9. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, the blades extending outwardly from the cutter body and each having a digging portion formed with a substantially arcuate longitudinal cutting edge lying substantially in a plane parallel to a radial plane, and offset from the radial plane forwardly in the direction of cutter rotation.

10. In a gyratory well drilling bit, the combination of a shank having a vertical longitudinal axis and adapted to be attached to a drill column; a cutter body rotatably mounted on the shank for rotation about a cutter axis inclined to said shank axis; and cutting blades on the cutter, the blades extending outwardly from the cutter body and each including a lower portion having digging teeth with arcuate longitudinal cutting edges lying in spherical surfaces with their centers at a common point on the cutter axis, and the cutting edges of each blade substantially lying in a plane angularly directed inwardly and forwardly, in the direction of rotation of the cutter relative to the formation being drilled, from an axial plane passing through the point of intersection of such firstnamed plane with a circle circumscribing the outermost portions of said blades.

JOHN A. ZUBLIN.